(12) United States Patent
Berg et al.

(10) Patent No.: US 11,172,675 B2
(45) Date of Patent: Nov. 16, 2021

(54) NANO PARTICULATE DELIVERY SYSTEM

(71) Applicant: Oro Agri Inc., Fresno, CA (US)

(72) Inventors: Paulo Sergio Berg, Londrina (BR); Melvin Donovan Pullen, Burbank, CA (US)

(73) Assignee: ORO AGRI INC., Fresno, CA (US)

( * ) Notice: Subject to any disclaimer, the term of this patent is extended or adjusted under 35 U.S.C. 154(b) by 420 days.

(21) Appl. No.: 14/579,517

(22) Filed: Dec. 22, 2014

(65) Prior Publication Data

US 2016/0174546 A1    Jun. 23, 2016

(51) Int. Cl.
*A01N 25/04* (2006.01)
*A01N 25/30* (2006.01)
*C05G 5/20* (2020.01)

(52) U.S. Cl.
CPC ............. *A01N 25/04* (2013.01); *A01N 25/30* (2013.01); *C05G 5/20* (2020.02)

(58) Field of Classification Search
CPC ........... A01N 25/04; A01N 25/30; C05G 5/20
See application file for complete search history.

(56) References Cited

U.S. PATENT DOCUMENTS

| | | | | |
|---|---|---|---|---|
| 2001/0036450 | A1* | 11/2001 | Verite | A61K 8/06 424/78.38 |
| 2005/0208083 | A1* | 9/2005 | Annis | A01N 25/02 424/400 |
| 2007/0117721 | A1* | 5/2007 | Keeney | A01N 43/40 504/235 |
| 2008/0193387 | A1* | 8/2008 | De Wolff | A61K 36/53 424/47 |
| 2010/0015236 | A1* | 1/2010 | Magdassi | A01N 25/04 424/489 |
| 2010/0041629 | A1* | 2/2010 | Giessler-Blank | A01N 25/04 514/65 |
| 2010/0305218 | A1* | 12/2010 | Wooster | A61K 9/1075 514/784 |
| 2011/0189294 | A1* | 8/2011 | Keiper | A01N 25/04 424/489 |

OTHER PUBLICATIONS

Soysolv, "Soysolv® Natural Cleaning Products, Solvents, and Bio Cleansers," <http://soysolv.com/soysolv/>, © 2015, p. 1-2.*
H. Noureddini et al., "Viscosities of Vegetable Oils and Fatty Acids," JAOCS, col. 69, No. 12, p. 1189-1191.*
Essential Industries, "Dilution Charts and Conversio nTables," <https://www.essind.com/carpet-care/dilution-charts-and-conversion-tables/#DC1>, Copyright 2014-2016, p. 1-4.*
Pitto-Barry et al., "Pluronic® block-copolymers in medicine: from chemical and biological versatility to rationalisation and clinical advances", Polym. Chem., 2014, 5, 3291.

* cited by examiner

*Primary Examiner* — Monica A Shin
(74) *Attorney, Agent, or Firm* — Knobbe Martens Olson & Bear LLP (57) ABSTRACT

A nano lipid delivery system is provided, more particularly, a nano concentrate, a nano-lipid stable emulsion, a method of preparing a nano lipid concentrate and lipid delivery system for use as a carrier for industrial, medical, animal, horticultural and agricultural chemistries.

8 Claims, 6 Drawing Sheets

NANO PARTICULATE DELIVERY SYSTEM

FIELD OF THE INVENTION

A nano lipid delivery system is provided, more particularly, a nano concentrate, a nano-lipid stable emulsion, a method of preparing a nano lipid concentrate and lipid delivery system for use as a carrier for industrial, medical, animal, horticultural and agricultural chemistries.

BACKGROUND OF THE INVENTION

The efficacy of agricultural chemistries such as pesticides, stimulants, desiccants, plant grow regulators and or nutrients are determined by the dispersion, absorption, translocation, metabolism and mode of action in the target pest or plant.

If these agricultural chemistries such as pesticides, stimulants, desiccants, plant grow regulators and or nutrients takes too long to be absorbed after application, their performance can be compromised by processes that could greatly reduce its absorption, such as rain, sunlight, humidity, temperature and wind, among others.

Once absorbed, sufficient agricultural chemistries, or their active ingredients, typically need to be quickly translocated from the point of application to the preferred site of action within, or on the target. If it is not, the products could degrade into non-toxic or less-toxic metabolites or components in the case of a pesticide, or reduced nutrient, desiccant or stimulant performance.

In the case of plants, several pathways act together in a relatively dependent manner for a quick and efficient translocation—everything is connected at different degrees of the plant's metabolic rate by the time reactions occur. For example, when a plant is under water, heat or moisture stress, it may react differently to the same dose of herbicide usually applied to that species in an unstressed state.

Additionally, from the leaf surface to the site of action movement involves passage through the apoplast and or symplast by several pathways, one of which is via plasmodesmata.

Means to address the translocation and surface contact are known to involve the addition of adjuvant technologies to enhance the efficacy of agricultural chemistries such as pesticides, stimulants and nutrients. This could include the use of Non-Ionic Surfactants (NIS), Methylated Seed Oils (MSO), High Surfactant Methylated Seed Oils (HSMSO), Crop Oil Concentrates (COC), Dormant-, Horticultural- or Vegetable-Oils.

One limitation of the known translocation methods is that while lipid to lipid products are good at cuticle penetration, adherence and wetting over plant surface area and into the leaf area, they can interfere with respiration, xylem and especially phloem translocation.

There have been numerous attempts in the prior art to develop nano lipid-based delivery systems that are capable of entrapping various materials of interest and for the effective delivery of the active to the target area of application. The known methods have resulted in generally spherical delivery systems known as liposomes which are composed of a lipid bilayer having an inner space in which the entrapped material is held. These delivery systems have been formed by methods employing mechanical agitation, for example, heating, phase inversion or sonication, among others.

The liposomes formed by such methods are generally heterogeneous in size and the stability or shelf-life of these liposomes is often very limited.

Other known methods disclose the means through crafted three-dimensional molecular structures, a technology that unites biotechnology and nanotechnology. DNA crystals are made by producing synthetic DNA sequences that can self-assemble into a series of three-dimensional triangle-like patterns.

The DNA crystals have "sticky-ends" or small cohesive sequences that can attach to another molecule in an organized fashion. When multiple helices are attached through single-stranded sticky ends, there would be a lattice-like structure that extends in six different directions, forming a three-dimensional crystal. This technique is applied in improving important crops by organizing and linking carbohydrates, lipids, proteins and nucleic acids to these crystals. Nanoparticles can serve as 'magic bullets', containing herbicides, agricultural chemicals, or genes, which target particular plant parts to release their content. Nano-capsules can enable effective penetration of the substance through cuticles and tissues, allowing slow and constant release of the active substances in the target.

In pesticide applications, these systems seem to interfere with symplastic translocation (trans-phloem) mobility and as such hindering the pesticide or nutrient mobility it may be carrying. It therefore remains a need to find a process that would assist in reducing the possibility of resistance by the plant or pest through improved performance of pesticide, nutrient or stimulant sprays or solutions through a carrier delivered to the target within the plant or pest.

The delivery of bio-affecting agents to the site where beneficial effect is needed presents several problems. Many agents are destroyed before they reach their intended target or negatively impact respiration, xylem and or phloem translocation. An effective nano particle delivery system has heretofore not been previously available.

SUMMARY OF THE INVENTION

A nano concentrate, a nano-lipid stable emulsion, a method of preparing a nano lipid concentrate and lipid delivery system for use as a carrier for industrial, medical, animal, horticultural and agricultural chemistries are provided.

More particularly, a nano-particle concentrate is provided comprising a composition of a lipid, oil or solvent having a viscosity of less than 100 cP at 25° C. and a Kauri Butanol solvency of greater than 25 Kb and at least one amphipathic compound selected from the group consisting of an alkoxylated lipid, an alkoxylated fatty acid, an alkoxylated alcohol, a heteroatomic hydrophilic lipid, a heteroatomic hydrophilic fatty acid, a heteroatomic hydrophilic alcohol or a combination of any of these compounds each of these compounds being derived from a compound having a viscosity of less than 1000 cP at 50° C. the resulting concentrate providing a stable nano emulsion having a particle size distribution of D50 and a mean average particle size distribution of less than 100 nm when diluted with water.

In further embodiments, the lipid, in its pure or treated form, may be a natural or synthetic, linear or branched, saturated or unsaturated, aliphatic or cyclic compound. The alkoxylated compounds, or heteroatomic hydrophilic lipid compounds may be pure or mixed with each other and the lipid, fatty acid or alcohol may be ethoxylated, propoxylated, sulphonated, nitrated or phosphinated.

In further embodiments, the lipid may be a natural compound such as an essential or edible oil extracted from a variety of plants or parts of plants such as trees, shrubs, leaves, flowers, grasses, fluids, herbs, fruits and seeds, pure or mixed with each other that are combined with one or more alcohol or fatty acid or oil ethoxylated, propoxylated, sulphonated, nitrated or phosphinated.

In further embodiments, a nano-particle concentrate is provided comprising one or more lipid, oil or solvent, natural or synthetic, linear or branched, saturated or unsaturated, aliphatic or cyclic, that has been esterified or transesterified to create a methylate or ethylated ester or diester, pure or mixed with each other that are combined with one or more alcohol or fatty acid or oil ethoxylated, propoxylated, sulphonated, nitrated or phosphinated.

In another embodiment, the use is provided of a lipid, oil or solvent, pure or that has been esterified or transesterified and combined with a fatty alcohol that has been ethoxylated or propoxylated, linear or branched, pure or that has been sulphonated, nitrated or phosphinated, preferably this fatty alcohol is an alcohol alkoxylate, or branched alkyl alcohol ethoxylated, or linear alcohol ethoxylated, primary or a secondary alcohol ethoxylated, with a 10 to 16 carbon chain and 4 to 35 degrees of ethoxylation or propoxylation, pure or mixed with other compounds ethoxylated, propoxylated, sulphonated, nitrated or phosphinated, transesterified.

In another embodiment, the use is provided of a lipid, oil or solvent pure or that has been esterified or transesterified and combined with a fatty acid that has been ethoxylated or propoxylated, linear or branched, pure or that has been sulphonated, nitrated or phosphinated. Preferably this fatty acid is a nonionic ethoxylated fatty acid, e.g., derived from vegetables like seed oils, or fatty acid ethoxylated or propoxylated derivates from soybean, coconut, corn, cotton, or other oil-containing plants, e.g., having carbon chains having a length of from 6 to 22 carbon atoms and from 2 to 60 degrees of ethoxylation or propoxylation; or ethoxylated fatty acid from animals, e.g., tallow fatty acid ethoxylated or propoxylated, having carbon chains having a length of from 10 to 26 carbon atoms and 2 to 60 degrees of ethoxylation or propoxylation; or single fatty acids ethoxylated or propoxylated (e.g., ricinoleic, oleic, stearic, laurylic, adipic acids, or the like) having carbon chains having a length of from 6 to 22 carbon atoms and 2 to 60 degrees of ethoxylation or propoxylation, pure or mixed with other compounds ethoxylated, propoxylated, sulphonated, nitrated or phosphinated. In this embodiment, the nano particle system has a ratio of from 2:98 to 90:10 [lipid/oil/solvent, pure or that has been esterified or transesterified: fatty acid that has been ethoxylated or propoxylated and then sulphonated, nitrated or phosphinated, pure or mixed].

In further embodiments, a nano-particle concentrate is provided comprising one or more lipids, oil or solvent, natural or synthetic, linear or branched, saturated or unsaturated, aliphatic or cyclic, pure or mixed with each other or with other solvents that includes but is not limited to acetates, terpenes, lactates, alcohols, ketones, natural oils, esters or diester, sulfoxides, glycols or hydrocarbons combined with one or more ethoxylated or propoxylated lipid, oil or solvent, natural or synthetic, sulphonated, nitrated or phosphinated, linear or branched, saturated or unsaturated, aliphatic or cyclic, pure or mixed with each other.

It will be clear to the person skilled in the art that a lipid includes the generic fatty acids and their naturally-occurring derivatives whether it is produced by extraction or synthetically derived such as saturated and unsaturated oils and waxes, esters, amides, glycerides, fatty acids, fatty alcohols, sterol and sterol esters, tocopherols, carotenoids, among others.

In an embodiment, the combined ratio of the nano particle system comprises a ratio of from 5:95 (lipid or oil or alcohol or mixtures of these to the heteroatomic hydrophilic fatty acid derivatives of pure lipid or oil or alcohol that has been alkoxylated or specifically that has been sulphonated, nitrated or phosphinated or ethoxylated and propoxylated) to 90:10 (lipid or oil or alcohol or mixtures of these to the heteroatomic hydrophilic fatty acid derivatives of lipid or oil or alcohol that has been alkoxylated or specifically that has been sulphonated, nitrated or phosphinated or ethoxylated and propoxylated).

In certain embodiments, the concentrate may be formulated as a concentrate solution or an emulsifiable concentrate.

In an embodiment, the nano particle system is a concentrate that is to be diluted for use in water or other chemistries.

In certain embodiments, the concentrate may be diluted with water in a mixing tank, spray tank or container, in an irrigation system or in the field with other devices.

In certain embodiments, the concentrate solution or the emulsifiable concentrate will be diluted in water to be applied to plants, pests, weeds, seeds, soil, urban plages, forests, equipment or surfaces, people, animals, among other.

In certain embodiments, the use is provided of a lipid, oil or solvent natural or synthetic, linear or branched, saturated or unsaturated, aliphatic or cyclic, pure or mixed with each other that has been esterified or transesterified combined with another lipid, oil or alcohol that has been ethoxylated, propoxylated, sulphonated, nitrated or phosphinated that is combined with other additives like acids and bases, stabilizers, antioxidants, quelant or complexing agents, aminoacids, salts, buffers, antifoams, spreaders, stickers, antifreezings, preservatives, dyes, hydrotropes, rheology modifiers and clarifiers, and other additives to further stabilize the concentrate.

In certain embodiments the lipid is a pesticide.

In certain embodiments, the use is provided of a lipid, oil or solvent natural or synthetic, linear or branched, saturated or unsaturated, aliphatic or cyclic, pure or mixed with each other that has been esterified or transesterified combined with another lipid, oil or alcohol that has been ethoxylated, propoxylated, sulphonated, nitrated or phosphinated that is combined with other diluent like pesticides, fertilizers, desiccants, defoliants, biocide, stimulants, amino and other acids, proteinates, fluid pharmaceutical applications, and combinations thereof.

In certain embodiments, a process is provided of producing a nano lipid delivery particle from a formulated concentrate which when diluted in water or other chemistry at a rate of 0.001% to 15.0% prior to application can effectively penetrate through tissue, leaf stomata, cuticle, upward and downward through the xylem and phloem down to the root zone of a target plant or pest.

A method is also provided for manufacturing a liquid nano lipid particle system which is suitable for delivery of active agricultural chemistries to a target, the method comprising the steps of: (a) preparing a bulk concentrate according to an embodiment, and (b) homogenizing the product to form a uniform mixture; and (c) adding water or other chemistry to form a stable nano emulsion.

In a further embodiment of the method for preparing the nano lipid particle concentrate and when diluted in water or other chemistry, the particle formed is a charged stable nano-sized particles with a narrow size distribution in the range from a few hundred nanometers to as small as 10 nm.

The particles exhibit improved dispensability, good stability and more accurate delivery of the active agents into the targeted sites.

In a further embodiment the resulting concentrate produced is readily emulsified in water as nano lipid particles with high solvency which when diluted at room temperature with water and minimal agitation readily disperses into stable nano lipid particles.

The particle size distribution of the particles upon dilution is generally from about 5 nm to 200 nm, typically from about 30 nm to 120 nm, more typically from about 50 nm to 100 nm.

In a further embodiment the nano particle concentrate can be tank mixed with water and other chemistries or can be formulated with other chemistries for further dilution in the field at a later stage.

The nano particles obtained are particularly suitable as a carrier for industrial, medical, animal, horticultural and agricultural chemistries, such as pesticides, stimulants, medicines, anti-scalents, herbicides, desiccants, defoliants, fungicides, growth agents, water, sugars, hydrocarbons, plant acids, nutrients including fertilizers and hormones or combinations thereof.

In a further embodiment a pesticide includes but is not limited to insecticide, fungicide, herbicide, desiccant, defoliant, acaricide, miticide, bactericide, biocide, ovicide, nematicide and insect and plant growth regulators.

The concentrates of the embodiments are formulations which remain in a stable form and result in a stable nano emulsion when diluted in water or other chemistries for purpose of application.

DETAILED DESCRIPTION

The production and use of lipid based nanoscale particles (NSP) are provided.

The concentrated shelf-stable NSP comprising at least one lipid and at least one ethoxylated, propoxylated, nitrated, phosphinated or sulphonated lipid, alcohol or fatty acid wherein the NSP concentrates are designed to deliver the medicinal, industrial or agricultural chemistry to a target area, plant or pest, particularly when the NSP is diluted in water or other vehicle to be applied.

The solvency characteristics of the lipid must be of such nature that the nano particle is able to efficiently penetrate the cuticle and other waxes to ensure the nano particle is able to function as transportation in the target in a translaminar, trans xylem and trans-phloem manner. The desired Kauri Butanol solvency value is greater than 25 Kb considering the index for lipid, oil or solvent alone or mixed with each other into the nano particle delivery system.

Definitions

The term "lipid" as used herein is a broad term, and is to be given its ordinary and customary meaning to a person of ordinary skill in the art (and is not to be limited to a special or customized meaning), and refers without limitation to saturated and unsaturated oils and waxes, esters, amides, glycerides, fatty acids, fatty alcohols, sterol and sterol esters, tocopherols, carotenoids, among others.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be polar or non-polar, linear or branched, cyclic or aliphatic, aromatic, naphthenic and that includes but is no limited to: alcohols, esters, diesters, ketones, acetates, terpenes, sulfoxides, glycols, paraffins, hydrocarbons, anhydrides, heterocyclics, among others.

The term "amphipathic" as used herein is a broad term, and is to be given its ordinary and customary meaning to a person of ordinary skill in the art (and is not to be limited to a special or customized meaning), and refers without limitation to compounds with some hydrophilic and hydrophobic characteristics, which allows them to surround non-polar substances like oil, grease or wax, isolating them from water.

The term "stable" as used herein is a broad term, and is to be given its ordinary and customary meaning to a person of ordinary skill in the art (and is not to be limited to a special or customized meaning), and refers without limitation to the emulsion stability, i.e. the ability of an emulsion to resist change in its properties over time so that the size of the droplets in emulsion does not change significantly with time, it is thus to be given its ordinary meaning that is customary to a person skilled in the art.

The acronym "NSP" as used herein is a broad term, and is to be given its ordinary and customary meaning to a person of ordinary skill in the art (and is not to be limited to a special or customized meaning), and refers without limitation to the nano-particle system of the embodiments and is interchangeably used with the acronym NLPD which as used herein carries the meaning of Nano Lipid Delivery System.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like.

The term "cycloalkyl" as used herein is a broad term, and is to be given its ordinary and customary meaning to a person of ordinary skill in the art (and is not to be limited to a special or customized meaning), and refers without limitation to alkyls that include mono-, di-, or poly-homocyclic rings. Cycloalkyls are also referred to as "cyclic alkyls" or "homocyclic rings." Representative saturated cyclic alkyls include cyclopropyl, cyclobutyl, cyclopentyl, cyclohexyl, —CH$_2$cyclopropyl, —CH$_2$cyclobutyl, —CH$_2$cyclopentyl, —CH$_2$cyclohexyl, and the like; while unsaturated cyclic alkyls include cyclopentenyl and cyclohexenyl, and the like. Cyclic alkyls include decalin, adamantane, and the like.

The term "aryl" as used herein is a broad term, and is to be given its ordinary and customary meaning to a person of ordinary skill in the art (and is not to be limited to a special or customized meaning), and refers without limitation to an aromatic carbocyclic moiety such as phenyl or naphthyl.

The term "arylalkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with an aryl moiety, such as benzyl, —CH$_2$(1-naphthyl), —CH$_2$(2-naphthyl), —(CH$_2$)$_2$phenyl, —(CH$_2$)$_3$phenyl, —CH(phenyl)$_2$, and the like.

The term "heteroaryl" as used herein is a broad term, and is to be given its ordinary and customary meaning to a person of ordinary skill in the art (and is not to be limited to a special or customized meaning), and refers without limitation to an aromatic heterocycle ring of 5 or 6 to 7, 8, 9, 10, 11, or 12 members and having at least one heteroatom (or 2, 3, or 4 or more heteroatoms) selected from nitrogen, oxygen, and sulfur, and containing at least one carbon atom, including both monocyclic and bicyclic ring systems. Representative heteroaryls include (but are not limited to) furyl, benzofuranyl, thiophenyl, benzothiophenyl, pyrrolyl, indolyl, isoindolyl, azaindolyl, pyridyl, quinolinyl, isoquinolinyl, oxazolyl, isooxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, and quinazolinyl.

The term "heteroarylalkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with a heteroaryl moiety, such as —CH$_2$pyridinyl, —CH$_2$pyrimidinyl, and the like.

The terms "heterocyclic", "heterocycle" and "heterocycle ring" as used herein are broad terms, and are to be given their ordinary and customary meaning to a person of ordinary skill in the art (and are not to be limited to special or customized meanings), and refer without limitation to a 5, 6, or, 7 membered monocyclic heterocyclic ring, or a 7, 8, 9, 10, 11, 12, 13, or 14 or more membered polycyclic heterocyclic ring. The ring can be saturated, unsaturated, aromatic, or nonaromatic, and can contain 1, 2, 3, or 4 or more heteroatoms independently selected from nitrogen, oxygen, and sulfur. The nitrogen and sulfur heteroatoms may be optionally oxidized, and the nitrogen heteroatom may be optionally quaternized, including bicyclic rings in which any of the above heterocycles are fused to a benzene ring as well as tricyclic (and higher) heterocyclic rings. The heterocycle can be attached via any heteroatom or carbon atom of the ring or rings. Heterocycles include heteroaryls as defined above. Thus, in addition to the aromatic heteroaryls listed above, heterocycles also include (but are not limited to) morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

The term "heterocyclealkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with a heterocycle, such as —CH$_2$-morpholinyl, and the like.

The term "substituted" as used herein is a broad term, and is to be given its ordinary and customary meaning to a person of ordinary skill in the art (and is not to be limited to a special or customized meaning), and refers without limitation to any of the above groups (e.g., alkyl, aryl, arylalkyl, heteroaryl, heteroarylalkyl, heterocycle or heterocyclealkyl) wherein at least one hydrogen atom is replaced with a substituent. In the case of a keto substituent (i.e., —C(=O)—) two hydrogen atoms are replaced. When substituted, "substituents," within the context of preferred embodiments, include halogen, hydroxy, cyano, nitro, phenol, amino, sorbitan, alkylamino, dialkylamino, alkyl, alkoxy, alkylthio, haloalkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl, substituted heterocyclealkyl, —NR$_a$R$_b$, —NR$_a$C(=O)R$_b$, —NR$_a$C(=O)NR$_b$R$_c$, —NR$_a$C(=O)OR$_b$, —NR$_a$SO$_2$R$_b$, —OR$_a$, —C(=O)R$_a$, —C(=O)OR$_a$, —C(=O)NR$_a$R$_b$, —OC(=O)NR$_a$R$_b$, —SH, —SR$_a$, —SOR$_a$, —S(=O)$_2$R$_a$, —OS(=O)$_2$R$_a$, —S(=O)$_2$OR$_a$, wherein R$_a$, R$_b$, and R$_c$ are the same or different and are independently selected from hydrogen, alkyl, haloalkyl, substituted alkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl or substituted heterocyclealkyl.

The term "halogen" as used herein is a broad term, and is to be given its ordinary and customary meaning to a person of ordinary skill in the art (and is not to be limited to a special or customized meaning), and refers without limitation to fluoro, chloro, bromo, and iodo.

The term "haloalky" as used herein is a broad term, and is to be given its ordinary and customary meaning to a person of ordinary skill in the art (and is not to be limited to a special or customized meaning), and refers without limitation to an alkyl having at least one hydrogen atom replaced with halogen, such as trifluoromethyl and the like.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S-alkyl) such as methylthio, ethylthio, and the like.

The term "alkylsulfonyl" as used herein is a broad term, and is to be given its ordinary and customary meaning to a person of ordinary skill in the art (and is not to be limited to a special or customized meaning), and refers without limitation to an alkyl moiety attached through a sulfonyl bridge (i.e., —SO$_2$-alkyl) such as methylsulfonyl, ethylsulfonyl, and the like.

The terms "alkylamino" and "dialkyl amino" as used herein are broad terms, and are to be given their ordinary and customary meanings to a person of ordinary skill in the art (and are not to be limited to special or customized meanings), and refer without limitation to one alkyl moiety or two alkyl moieties, respectively, attached through a nitrogen bridge (i.e., —N-alkyl) such as methylamino, ethylamino, dimethylamino, diethylamino, and the like.

The term "alkylphenol" as used herein is a broad term, and is to be given its ordinary and customary meaning to a person of ordinary skill in the art (and is not to be limited to a special or customized meaning), and refers without limitation to an alkyl substituted with at least one phenol group The term "hydroxyalkyl" as used herein is a broad term, and is to be given its ordinary and customary meaning to a person of ordinary skill in the art (and is not to be limited to a special or customized meaning), and refers without limitation to an alkyl substituted with at least one hydroxyl group.

The term "mono- or di-(cycloalkyl)methyl" as used herein is a broad term, and is to be given its ordinary and customary meaning to a person of ordinary skill in the art (and is not to be limited to a special or customized meaning), and refers without limitation to a methyl group substituted with one or two cycloalkyl groups, such as cyclopropylmethyl, dicyclopropylmethyl, and the like.

The term "alkylcarbonylalkyl" as used herein is a broad term, and is to be given its ordinary and customary meaning to a person of ordinary skill in the art (and is not limited to a special or customized meaning), and refers without limitation to an alkyl substituted with a —C(=O)-alkyl group.

The term "alkylcarbonyloxyalkyl" as used herein is a broad term, and is to be given its ordinary and customary meaning to a person of ordinary skill in the art (and is not to be limited to a special or customized meaning), and refers without limitation to an alkyl substituted with a —C(=O)O-alkyl group or a —OC(=O)-alkyl group.

The term "alkyloxyalkyl" as used herein is a broad term, and is to be given its ordinary and customary meaning to a person of ordinary skill in the art (and is not to be limited to a special or customized meaning), and refers without limitation to an alkyl substituted with an —O-alkyl group.

The term "alkylthioalkyl" as used herein is a broad term, and is to be given its ordinary and customary meaning to a person of ordinary skill in the art (and is not to be limited to a special or customized meaning), and refers without limitation to an alkyl substituted with a —S-alkyl group.

The term "mono- or di-(alkyl)amino" as used herein is a broad term, and is to be given its ordinary and customary meaning to a person of ordinary skill in the art (and is not to be limited to a special or customized meaning), and refers without limitation to an amino substituted with one alkyl or with two alkyls, respectively.

The term "mono- or di-(alkyl)aminoalkyl" as used herein is a broad term, and is to be given its ordinary and customary meaning to a person of ordinary skill in the art (and is not to be limited to a special or customized meaning), and refers without limitation to an alkyl substituted with a mono- or di-(alkyl)amino.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "acetates" as used herein is a broad term, and is to be given its ordinary and customary meaning to a person of ordinary skill in the art (and is not to be limited to a special or customized meaning), and refers without limitation to any compound as described herein incorporating one or more acetate groups, such as salts, esters or other compounds incorporating a CH$_3$COO— moiety.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers, or to synthetically produced compounds having the same structures as plant derived terpenes. Terpenes can include hydrocarbons as well as terpenoids containing additional functional groups, as well as essential oils. Terpenes can include compounds having a formula $(C_5H_8)_n$ where n is the number of linked isoprene units (e.g., 1, 2, 3, 4, 5, 6, 7, 8, 9, 10, or more).

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula H(OCH$_2$CH$_2$)$_n$OH where n is greater than three), polypropylene glycols, or glycols incorporating monomers comprising longer hydrocarbon chains.

The term "paraffins" as used herein is a broad term, and is to be given its ordinary and customary meaning to a person of ordinary skill in the art (and is not to be limited to a special or customized meaning), and refers without limitation to heavier alkanes, such as alkanes forming a liquid or wax at room temperature, as well as functionalized paraffins, e.g., chlorinated paraffins, and mineral or synthetic oils comprising hydrocarbons.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O$), or being substituted by or functionalized to include one or more anhydride groups.

The cyclic systems referred to herein include fused ring, bridged ring, and spiro ring moieties, in addition to isolated monocyclic moieties.

Any percentages, ratios or other quantities referred to herein are on a weight basis, unless otherwise indicated.

Method of Preparation of the Concentrate

For the purpose of illustration, the method for preparing the concentrate as used in the non-limiting examples is by admixing a lipid, oil or solvent and a second component such as a sulphonated or ethoxylated lipid, stirring the mixture while heating it up to a temperature of between 15 and 50° C. Heating is not necessarily required but will depend on the physical state of each compound. For certain components, lower temperatures or higher temperatures may be employed. The temperature can be selected so as to facilitate mixing within a desired time period, while avoiding degradation or undesired reaction of the components. The concentrate can also be prepared by replacing the ethoxylated or sulphonated lipid with an ethoxylated or sulphonated alcohol or other ethoxylated, propoxylated, nitrated, sulphonated or phosphinated compound.

The ratio of the nano particle system is typically from 5:95 to 90:10 [lipid/oil/alcohol: lipid/oil/alcohol that has been ethoxylated, propoxylated, sulphonated, nitrated or phosphinated] by weight percentage. In certain embodiments higher or lower ratios may be employed; however, a mixture of about 1 part by weight of the lipid/oil/alcohol to about 0.1 to 20 parts by weight of the lipid/oil/alcohol that has been ethoxylated, propoxylated, sulphonated, nitrated or phosphinated can advantageously be employed. Water and other additives are not included in the calculation of the ratio. The nano particle system so prepared is a concentrate which is readily dispersible in water or other chemistries as nano lipid particles with high solvency which when diluted at room temperature with water and minimal agitation readily disperses into nano lipid particles.

A lipid, oil or solvent with a Kauri Butanol value greater than 25 Kb and a viscosity of less than 100 Centipoise (cP) at 25° C., as a single component or blended components, is combined with another lipid, fatty acid or alcohol that has been alkoxylated and typically ethoxylated, propoxylated or a derivative of a heteroatomic hydrophilic lipid, typically sulphonated, nitrated or phosphinated. Methods of alkoxylating (e.g., ethoxylating or propoxylating) such as lipids, fatty acids, or fatty alcohols, are known in the art, as are methods of sulfonating, nitrating, and/or phosphinating compounds. The chemistry of such compounds is discussed in "Fatty Acid and Lipid Chemistry" by F. D. Gunstone, published by Springer on Apr. 10, 2007, the contents of which are hereby incorporated by reference in their entirety.

The nano lipid particle concentrate prepared by the method of the embodiments provides nano-sized particles with a narrow size distribution in the range from a few hundred nanometers (e.g., 900, 800, 700, 600, 500, 400, 300, 200, 100 nm, or any value therebetween) to as small as 90, 80, 70, 60, 50, 40, 30, 20, or 10 nm. The particles exhibit improved dispensability, good stability as a result of their crystalline nature, and more accurate delivery of the active agents into the targeted sites when compared to known nano particle delivery systems.

Analysis and Tests

Samples were analyzed using two particle size measurement techniques: Dynamic Lightening Scattering (DLS) and Nano Tracking Analysis (NTA) to define the particle size distribution for each of the nano-particle concentrated prepared.

As can be seen from Tables 1 and 2 both DLS and NTA measure the Brownian motion of nanoparticles whose speed of motion, or diffusion constant, is related to particle size through the Stokes-Einstein equation.

TABLE 1

Results from the equipment Particulate Systems NanoPlus or Delsa Nano

| Sample | Dilution (% w/w) | Mean Size (nm) | D10 (nm) | D50 (nm) | D90 (nm) |
|---|---|---|---|---|---|
| Prior Art Product A | 0.34 | 208.1 | 103.4 | 217.3 | 483.7 |
| Prior Art Product B | 0.39 | 586.2 | 93.0 | 895.3 | 3697.7 |
| Prior Art Product C | 0.33 | 555.0 | 125.9 | 696.4 | 3243.0 |
| Prior Art Product D | 0.40 | 591.7 | 56.6 | 434.0 | 4033.4 |
| ORO-001 | 0.38 | 71.3 | 36.9 | 78.7 | 170.4 |
| ORO-002 | 0.43 | 94.1 | 57.8 | 99.6 | 173.4 |
| ORO-003 | 0.10-2.00 | ND | — | — | — |
| ORO-004 | 0.10-2.00 | ND | — | — | — |
| ORO-005 | 0.10-2.00 | ND | — | — | — |

ND means not detected

TABLE 2

Results from the equipment NanoSight LM-20

| Samples | Dilution (ppm) | Mean Size (nm) | D10 (nm) | D50 (nm) | D90 (nm) |
|---|---|---|---|---|---|
| Prior Art Product A | 0.838 | 148 | 86 | 144 | 213 |
| Prior Art Product B | 0.600 | 148 | 59 | 131 | 250 |
| Prior Art Product C | 0.600 | 151 | 89 | 143 | 221 |
| Prior Art Product D | 0.814 | 112 | 63 | 101 | 177 |
| ORO-001 | 6.20 | 89 | 51 | 85 | 128 |
| ORO-002 | 228.8 | 93 | 58 | 87 | 130 |
| ORO-003 | 5883.1 | 96 | 61 | 89 | 135 |
| ORO-004 | 88.1 | 100 | 58 | 89 | 148 |
| ORO-005 | 2260 | 96 | 50 | 91 | 147 |

In NTA this motion is analyzed by video—individual particle positional changes are tracked in two dimensions from which the particle diffusion is determined. Knowing diffusion constant, the particle hydrodynamic diameter can be then determined.

In contrast, DLS does not visualize the particles individually but analyzes, using a digital correlator, the time dependent scattering intensity fluctuations. These fluctuations are caused by interference effects arising from the relative Brownian movements of an ensemble of a large number of particles within a sample. Through analysis of the resultant exponential autocorrelation function, average particle size can be calculated as well as a polydispersity index. For multi-exponential autocorrelation functions arising from polydisperse samples, deconvolution can furnish limited information about the particle size distribution profile.

Particle Sizing by Dynamic Light Scattering

Particles suspended in liquids are in Brownian motion due to random collisions with solvent molecules. This motion causes the particles to diffuse through the medium.

Particle size can be determined by measuring the random changes in the intensity of light scattered from a suspension or solution. This technique is known as dynamic light scattering (DLS) or also called photon correlation spectroscopy (PCS).

Sample Preparation: Drops of the sample are dispersed/emulsified directly to a portion of deionized water forming a solution with particles/micelles from the product. A portion this solution was collected in a cell to be read by the equipment.

At least three runs were done for each solution and the results are overlaid to create a full report for each product/sample.

Particle Sizing by Nano Tracking Analysis

NanoSight nanoparticle analysis instruments generate videos of a population of nanoparticles moving under Brownian motion in a liquid when illuminated by laser light. Within a specially designed and constructed laser illumination device mounted under a microscope objective, particles in the liquid sample which pass through the beam path are seen by the instrument as small points of light moving rapidly under Brownian motion.

Sample Preparation: Drops of sample are dispersed/emulsified directly to a portion of deionized water forming a solution with particles/micelles from the product. A portion from this solution is collected in a cell to be read by the equipment.

At least three runs were done for each solution and the results are overlaid to create a full report for each product/sample. The samples of the product of the embodiments are indicated by samples ORO-001 to ORO-005 respectively. It is clear that the nano particle size distribution is much smaller than any of the prior art products tested. It was observed in all samples of the products of the embodiments that some small particles (below 10 nanometers) won't be detected and be measured even by Nano Tracking Analysis.

It is noted that the amount was increased of product of all samples from the embodiments diluted in water to achieve particles detectable for the equipment. In some cases as ORO-005 and ORO-003 the comparative increase was 2500 and 7000 times more than the products of the prior art.

Even for ORO-001, ORO-004 or ORO-002 the increase was 7, 10 or 250 times more. It was observed that several smaller particles (below 10 nanometers) would not be detected and remained outside average, determining that the average size of these products is even lower that measured here. It shows that all products of the embodiments here described are smaller than other products from the prior art.

Comparing both techniques, results from NanoSight are more stable and the results founded were related with the particles viewed/measured into the solutions.

All the solutions of the samples remained stable during the time of analysis at the concentration worked (ppm) and thereafter.

Even at high concentration of the products of the invention in water the particles were not detected by the Nano Plus or by Delsa Nano that use the Dynamic Light Scattering detection systems.

Samples of the concentrate of the embodiments show a particle size of less than 10 nanometers this is evidenced through testing in that only when increasing the sample concentration in reading solution is that it is possible to obtain particles detectable. From the results it is clear that the nano-lipid particle size distribution of the stable emulsion of the embodiments is nano-sized below 100 nm in most cases and the performance as particle delivery system is an improvement on known products.

Physical Chemical and Accelerated Stability Tests

Samples of products of the embodiments and from the prior art were analyzed to determine their physical chemical characteristics and their behavior when diluted in water—pH and stability of emulsion, using methodology described on CIPAC Handbook F—collaborative international pesticide analytical Ltd, 1994, reprint in 2007, the contents of which are hereby incorporated by reference in their entirety. It was determined the accelerated storage stability and all samples were stable even in cold or hot conditions.

The first set of analysis is set out in Table 3 and shows the results from samples of Nano Lipid Delivery System and it evidence that all samples prepared according this embodiments is stable even in concentrated form or when diluted in water.

TABLE 3

NLDS - Physical and Chemical and Accelerated Stability Tests results

| ANALYSIS | ORO-001 | ORO-002 | ORO-003 | ORO-004 | ORO-005 |
| --- | --- | --- | --- | --- | --- |
| Appearance (product) | Clear Yellowish Liquid | Clear Yellowish Liquid | Clear Yellowish Liquid | Clear Yellowish Liquid | Clear Yellowish Liquid |
| Density @ 20° C. | 0.9110 | 0.9040 | 1.0221 | 1.0201 | 1.0247 |
| pH (product) | 6.07 | 6.02 | 7.22 | 7.31 | 6.18 |
| pH (1% v/v) | 6.48 | 5.40 | 7.63 | 7.56 | 6.24 |
| Viscosity @ 25° C. | 48 cP | 54 cP | 206 cP | 148 cP | 164 cP |
| Appearance (solution at 0.25% - distilled water) | Light Cloudy | Light Cloudy | Clear | Clear | Clear |
| Emulsion Stability (CIPAC MT 36) 1% v/v 2 hours @ 30° C. Water CIPAC A and D | No cream and No Oil | No cream and No Oil | No cream and No Oil | No cream and No Oil | No cream and No Oil |
| Emulsion Stability Method CIPAC MT 36 1% v/v 24: 30 hours re-emulsified at 30° C. Water CIPAC A and D | No cream and No Oil | No cream and No Oil | No cream and No Oil | No cream and No Oil | No cream and No Oil |
| Accelerated Storage Procedure Method CIPAC MT 46 (14 days at 5, 20 and 54° C.) | Stable | Stable | Stable | Stable | Stable |

The second set of samples in Table 4 is from prior art products and the results showing some inconsistency when the product is diluted in water.

TABLE 4

Prior Art Products - Physical and Chemical and Accelerated Stability Tests results

| ANALYSIS | PRIOR ART 1 | PRIOR ART 2 | PRIOR ART 3 | PRIOR ART 4 |
|---|---|---|---|---|
| Appearance (product) | Clear Yellowish Liquid | Clear Yellowish Liquid | Clear Yellowish Liquid | Clear Yellowish Liquid |
| Density @ 20° C. | 0.9041 | 0.9176 | 0.8994 | 0.8243 |
| pH (product) | 5.07 | 4.62 | 4.82 | 3.84 |
| pH (1% v/v) | 5.48 | 5.10 | 5.15 | 4.77 |
| Viscosity @ 25° C. | 46 cP | 62 cP | 44 cP | 38 cP |
| Appearance (solution at 0.25% - distillated water) | Cloudy | Cloudy | Cloudy | Light Cloudy |
| Emulsion Stability (CIPAC MT 36) 1% v/v 2 hours @ 30° C. Water CIPAC A and D | 0.1% cream and No Oil | 0.1% cream and No Oil | 0.2% cream and No Oil | No cream and No Oil |
| Emulsion Stability Method CIPAC MT 36 1% v/v 24 h 30 hours re-emulsified at 30° C. Water CIPAC A and D | 0.1% cream and No Oil | 0.1% cream and No Oil | 0.2% cream and No Oil | No cream and No Oil |
| Accelerated Storage Procedure Method CIPAC MT 46 (14 days at 5, 20 and 54° C.) | Stable | Stable | Stable | Stable |

Examples

Various nano particle systems were produced to illustrate the embodiments. Various components were employed in the various formulations, including Stepan Company's BIO SOFT® N91-6—linear alcohol (C9-11) ethoxylate, POE-6; Stepan Company's MAKON® 12—nonionic surfactant; Stepan Company's—sodium dodecylbenzene sulfonate anionic surfactant; UREIA TECNICA®—technical urea; Oxiento's ALKOPON® N—Sodium Lauryl Ether Sulfate 27%; Stepan Company's BIO SOFT® AS-40—an aqueous solution of alpha olefin sulfonate; SULFONOL® EMSJ—soy methyl ester; ACETONA P.A.®—acetone; PROXEL GXL®—a 20% aqueous dipropylene glycol solution of 1,2-benzisothiazolin-3-one; ACIDO CITRICO 50%®—citric acid 50%; Oxiteno's SURFOM® R-200—ethoxylated castor oil; Dow Chemical's TERGITOL® 15-S-9—a secondary alcohol ethoxylate, nonionic surfactant; QGP Quimica's SULFONOL® DBSCA-AG—Alkyl Benzene Sulfonate Calcium in Isobutanol; OLA001 OLEO ESSENCIAL DE LARANJA®—essential orange oil; BHT FEED GRADE®—butylated hydroxytoluene; Dow Corning's XYAMETER® AFE1520—20% active, food-grade silicone emulsion designed to control foam in both hot and cold aqueous systems.

The first set of examples is set out in Table 5 and is for a mixture of lipid or oil that has been esterified or transesterified, wherein the compound has a carbon chain of C10-C22, derivated, among others from seed oils, as methyl ester, mixed with a natural oil and with a methylated alkyl ester. In this set of samples the ratio of the nano particle system comprises a weight ratio of from 50:50 to 90:10 [lipid/oil pure or that has been esterified or transesterified: lipid/oil/alcohol that has been ethoxylated or propoxylated and then sulphonated, nitrated or phosphinated, mixed].

TABLE 5

Example 1 of concentrated Nano Lipid Delivery System

| NSP composition (Brand Name) | ORO-001 | ORO-002 |
|---|---|---|
| | Amount (weight %) | |
| Esterified Oil 1 (SULFONOL ® EMSJ) | 62.50% | 66.50% |
| Fatty Acid Alkoxylated 1 (SURFOM ® R-200) | 4.00% | 3.80% |
| Alcohol Alkoxylated 2 (TERGITOL ® 15-S-9) | 11.00% | 7.90% |
| Heteroatomic Hydrocarbon 3 (SULFONOL ® DBSCA-AG) | 12.00% | 11.90% |
| Natural Oil 2 (OLA001 OLEO ESSENCIAL DE LARANJA ®) | 5.00% | 4.70% |
| Esterified Oil 2 (SULFONOL ® EMCC) | 5.00% | 4.70% |
| Antioxidant agent (BHT FEED GRADE ®) | 0.10% | 0.10% |
| Antifoam agent (XYAMETER ® AFE-1520) | 0.40% | 0.40% |
| RATIO Oil:Heteroatomic or Alkoxylated Compounds (Weight %) | Ratio 73:27 | Ratio 76:24 |

The second set of examples is set out in Table 6 and is for a mixture of lipid or oil, pure or that has been esterified or transesterified; made with compound between C10-C22 carbon chain, derivate among others from seed oils, as methyl ester; or with a natural oil; or with a linear ketone. In this set of samples the ratio of the nano particle system comprises a weight ratio of from 5:95 to 40:60 [lipid/oil pure or that has been esterified or transesterified: lipid/oil/alcohol that has been ethoxylated or propoxylated and then sulphonated, nitrated or phosphinated, mixed each other].

TABLE 6

Example 2 of concentrated Nano Lipid Delivery System

| NSP composition (Brand Name) | ORO-003 | ORO-004 | ORO-005 |
|---|---|---|---|
| | Amount (weight %) | | |
| Alcohol Alkoxylated 1 (BIO SOFT ® N91-6) | 8.0 | — | 8.0 |

TABLE 6-continued

Example 2 of concentrated Nano Lipid Delivery System

| NSP composition (Brand Name) | ORO-003 | ORO-004 | ORO-005 |
|---|---|---|---|
| | Amount (weight %) | | |
| Alkylphenol Alkoxylated 1 (MAKON ® 12) | — | 8.0 | — |
| Water | 62.8 | 62.8 | 62.8 |
| Heteroatomic Hydrocarbon 1 (BIO SOFT ® SDBS-30-LA) | 13.0 | 13.0 | — |
| Heteroatomic Hydrocarbon 2 (AGENT 3354/43 ®) | — | — | 13.0 |
| Hydrotrope Agent (UREIA TECNICA ®) | 0.80 | 0.80 | 0.80 |
| Heteroatomic Alkoxylated 3 (ALKOPON ® N) | 7.0 | 7.0 | 7.0 |
| Heteroatomic Hydrocarbon 4 (BIO SOFT ® AS-40) | 1.7 | 1.7 | 1.7 |
| Antioxidant Agent (BHT FEED GRADE ®) | 0.1 | 0.1 | 0.1 |
| Esterified Oil 1 (SULFONOL ® EMSJ) | 6.0 | — | — |
| Natural Oil 2 (OLA001 OLEO ESSENCIAL DE LARANJA ®) | — | 6.0 | — |
| Ketone (Oil) 3 (ACETONA P.A. ®) | — | — | 6.0 |
| Biocide Agent (PROXEL GXL ®) | 0.4 | 0.4 | 0.4 |
| pH Adjuster (ACIDO CITRICO 50% ®) | 0.2 | 0.2 | 0.2 |
| RATIO Oil:Heteroatomic or Alkoxylated Compounds (Weight %) | 28:72 | 28:72 | 28:72 |

Uptake and Translocation Test

The translocation of an active agent to a target site was illustrated in adding the nano-particle delivery system to a known pesticide and applying it to a plant comparing it to other similar products on the market. From FIG. 1 it is clear that the product of the embodiments when applied as herbicide carrier has the ability to translocate the herbicide through the plants more effectively and without negatively affecting the plant or the performance of the herbicide.

In the example of pesticide (on Lambs quarter), while the uptake was increased with most adjuvants, the critical component is to increase the amount of pesticide to the lower part of the plant or the roots to increase performance. When most of the pesticide remains in the foliar areas, it will burn down the leaves effectively however a lack of mobility down to the roots could result in re-emergence and increase resistance pressure over time.

In view of the ability of translocation of the NSP on the delivery of agriculture chemistry this would imply that nutrients required at the roots could be supplied at foliar level and could travel through the Phloem down to the roots to reduce the amount of nutrients required per acre and also reduce environmental impact by using less fertilizer. (Macro and Micro)

The perfect tank product would therefore not only increase the uptake but also increase the distribution within the plants through the Phloem (and in other cases upward in the Xylem) down to the lower part of the plant and the roots without undesired impact to the plant or non-target plant.

Additionally, a quicker uptake also improves rainfastness and therefore reduces the potential for the agricultural chemistries washing off the targeted insect or plant surface areas.

Figure 1:
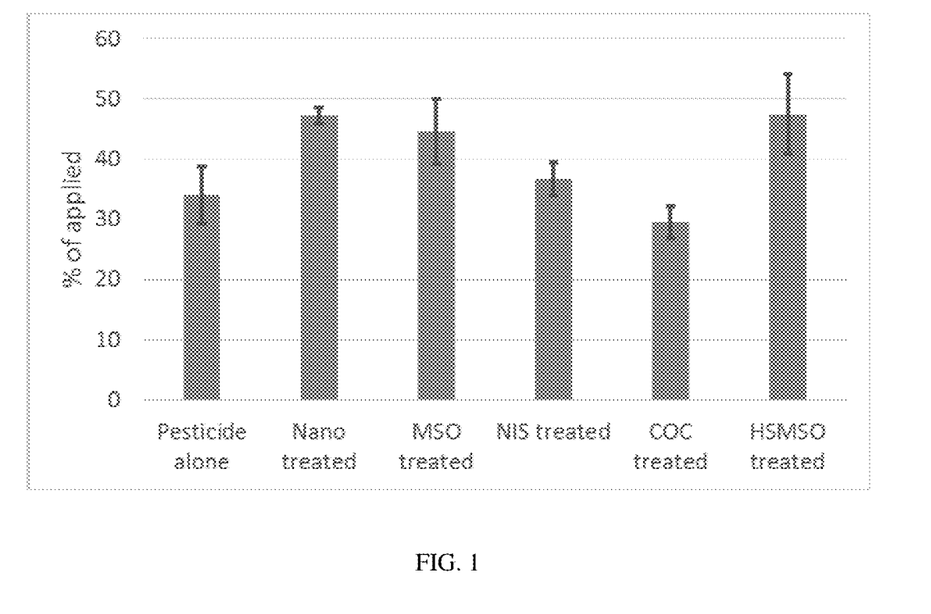
FIG. 1 is graph depicting pesticide uptake by Lambs quarter weed 24 hours after pesticide treatment. Comparative data is provided for pesticide alone, nano, MSO, NIS, COC, and HSMSO treated plants.

As can be seen from the comparison in FIG. 1, the NSP of the embodiments performed better than known non-ionic surfactant and or oil emulsions by increasing pesticide or other chemical mobility and consistency throughout the entire plant, even low down into the lower canopy and roots where pesticides works the most efficiently.

When used as an adjuvant, the initial test work shown adjuvants other than the NSP performed well on the upper foliar burn down, they appear to negatively affect pesticide performance by insufficient trans phloem and or xylem mobility to where pesticide is required to improve performance. It is a conclusion and observation of the inventors that the adjuvants tested can contribute to increased pesticide resistance through mobility inhibition.

More effective delivery and control, as the NSP delivery system of the embodiments provides, reduce the likeliness of second and third re-applications of pesticides and thereby benefiting the environment and safety by reduction of frequency in dealing with pesticides.

Figure 2:
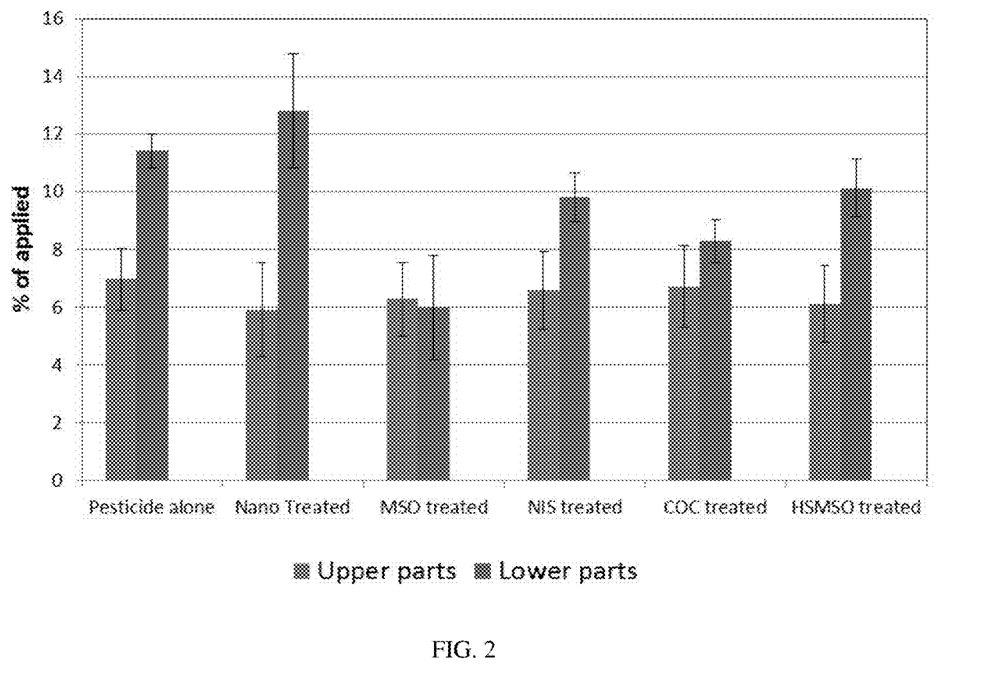
FIG. 2 is graph depicting translocation of pesticide into Lambs quarter weed upper and lower plant sections. Comparative data is provided for plants treated with pesticide alone versus pesticide in a nano particle emulsion, a Methylated Seed Oil (MSO), a Non-Ionic Surfactant (NIS), a Crop Oil Concentrate (COC), or a High Surfactant Methylated Seed Oil (HSMSO) formulation.

In FIG. 2 it is illustrated that the rate at which the NSP of the embodiments is taken up, is faster than pesticide alone. This shows the rain fastness of the embodiments. Through accelerated uptake the risk of rain wash off from the leaf surface is minimize.

As the data indicates in FIG. 2, the new NSP of the embodiments out performs the known technology available by delivering more pesticide via foliar application down to the roots.

Figure 3A:
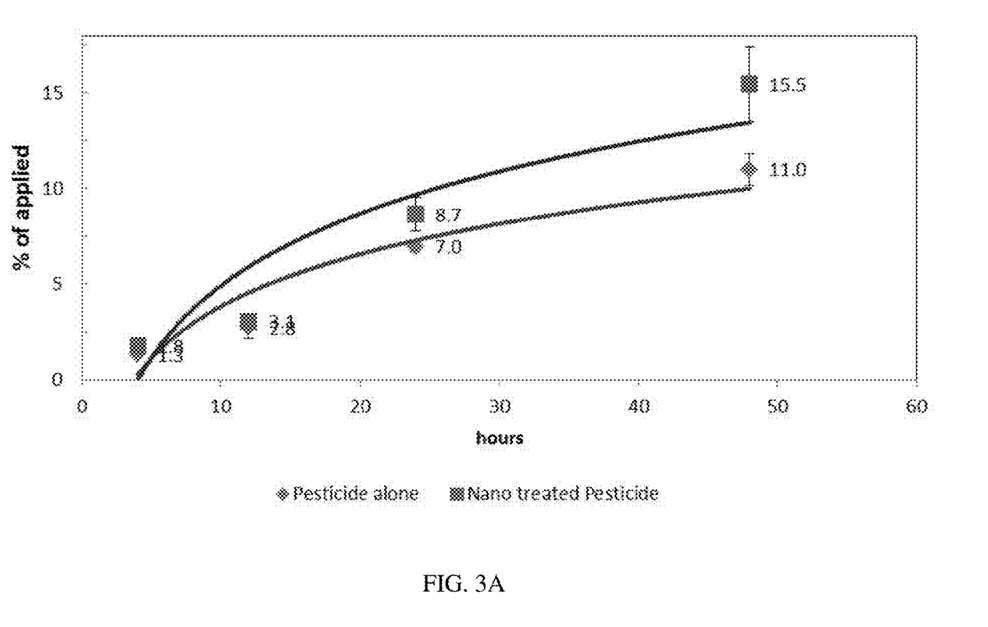
FIG. 3A is graph depicting translocation of pesticide with and without nanoscale particles (NSP) as a carrier (time course).
Figure 3B:
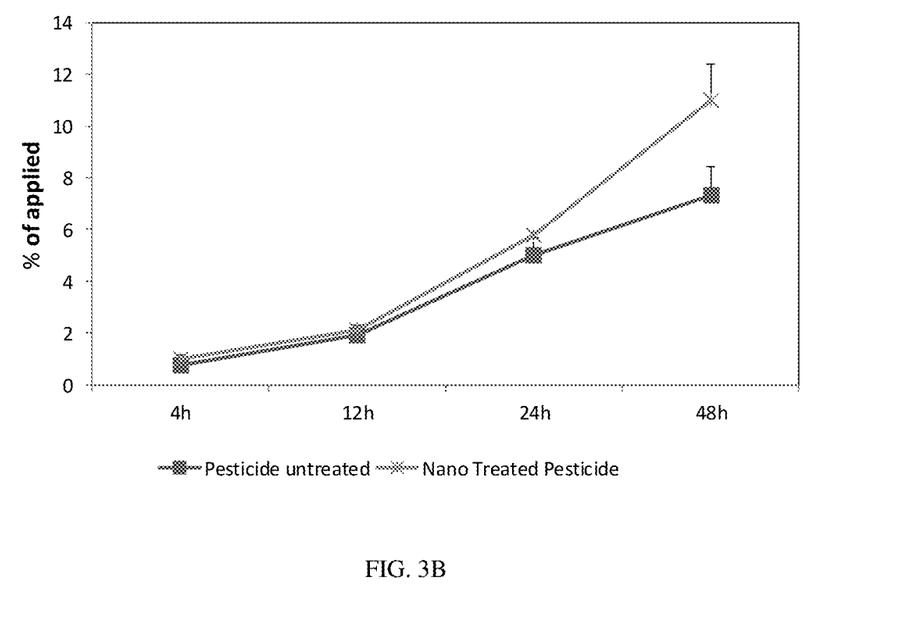
FIG. 3B is graph depicting translocation of pesticide in dissected plant parts after treatments with pesticide alone versus a pesticide application treated at 0.25% with NSP. The pesticide application utilizing 0.25% NSP shows increased penetration of pesticide into the lower parts of the plant over time (time course).
Figure 3C:
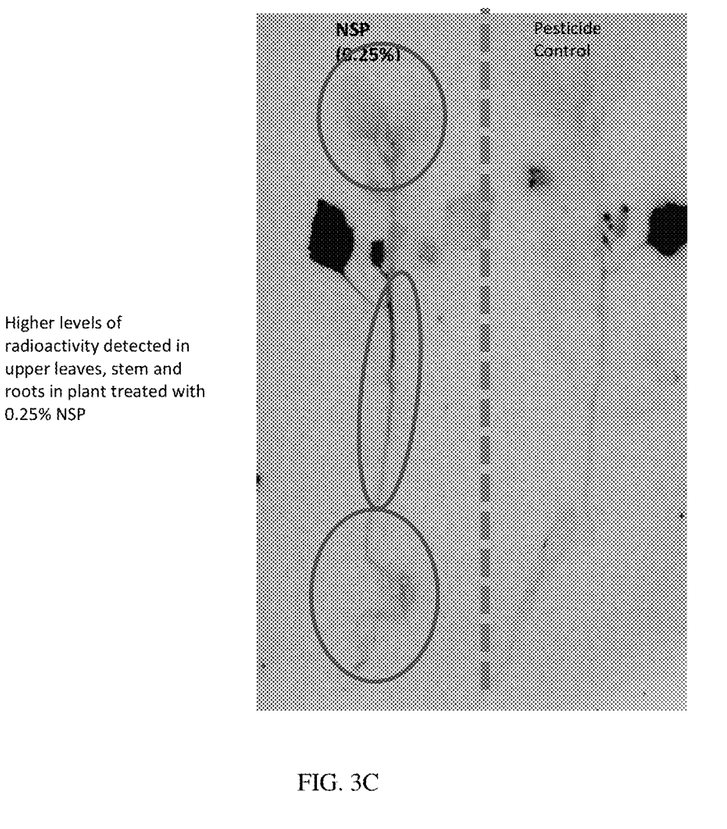
FIG. 3C is a photograph depicting a phosphor-image 36 hrs after pesticide application. Higher levels of radioactivity are detected in upper leaves, stem and roots in plants treated with a 0.25% NSP formulation, as indicated in the circled portions of the image.

In FIGS. 3A, 3B and 3C it is illustrated that more pesticide is translocating quicker to all parts of the plant when NSP technology of the embodiments is added than when the pesticide is used alone. This not only delivers the agricultural chemistries to target site prior to the other chemistries breakdown but also improves rain-fastness timing as more of the accompanied chemistries is penetrated in a shorter amount of time.

Figure 3D:
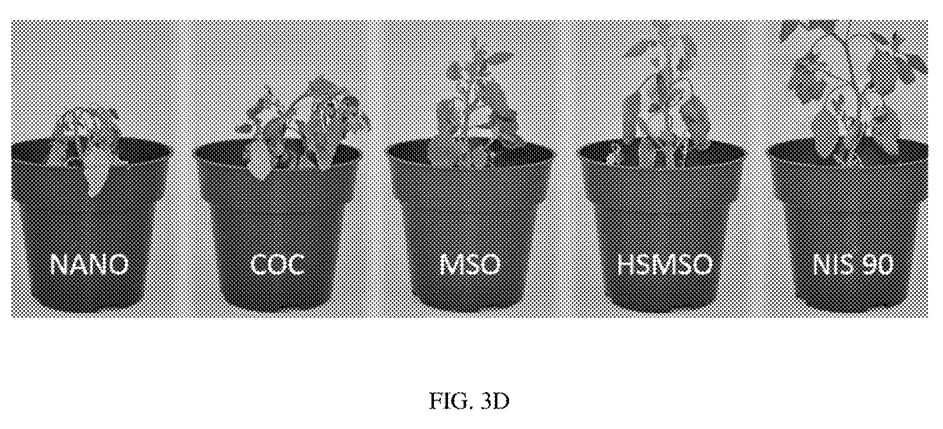
FIG. 3D is a photograph depicting the effect of herbicide on Lambs quarter weed growth performance with NSP versus other adjuvants (9 days after treatment).

In FIG. 3D, it is illustrated that the NPS is more effective at delivering a quicker and improved active ingredient such as but not limited to herbicide.

Application and Use

In use the nano lipid particles can be applied as concentrate or as a dilution.

When diluted with water at a rate of 0.001 to 15% (by weight), more typically from 0.005% to 1% (by weight) prior to application, the nano lipid delivery particles have a D50 and a mean particle size distribution of smaller than 100 nanometers which can effectively penetrate through the leaf stomata and cuticle area and effectively through the xylem and the phloem down to the root zone of a target plant. In certain embodiments, more concentrated or more diluted compositions can advantageously be employed.

The diluted concentrate can be applied by means of agricultural spray or irrigation water.

In use as concentrate, the nano particle concentrate can be tank mixed with water and other chemistries or can be formulated with other chemistries for further dilution in the field at a later stage.

The nano particles obtained are particularly suitable as a carrier for agricultural chemistries such as pesticide, stimulants, herbicides, fungicides, growth agents, nutrients including fertilizers and hormones or combinations thereof.

Specific advantages of the NSP is that some non-systemic pesticides can likely become mobile like systemic pesticides or systemic pesticides could become more efficient in mobility such as triazoles.

Other benefits of the NSP are the increased nanoparticle delivery to the target to manage resistance resulting from NSP acting as carrier to more effectively transfer the agriculture chemistry to the root zone of the plant and quicker rain fastness than other technologies resulting from more efficient uptake into the plant.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A stable liquid nano-particle emulsion comprising nano-particles, wherein the nano-particles comprise:
   62.50 wt % to 66.5 wt % of a C10-C22 methyl ester derived from a seed oil;
   4.70 wt % to 5.00 wt % of a methylated alkyl ester;
   4.70 wt % to 5.00 wt % of an essential orange oil;
   3.80 wt % to 4.00 wt % of an ethoxylated fatty acid;
   7.90 wt % to 11.00 wt % of a C9-C11 ethoxylated alcohol;
   11.90 wt % to 12.00 wt % of an alkyl benzene sulfonate calcium salt;
   about 0.50 wt % of additives including an antifoam agent and antioxidant agent;
   wherein the nano-particles have a D50 and a mean average particle size of less than 100 nm, wherein the nano-particles are diluted to form the stable liquid nano-particle emulsion, and
   wherein the stable nano-particle emulsion is adapted for use as a carrier for an agricultural chemistry.

2. The stable liquid nano-particle emulsion according to claim 1, wherein the degree of ethoxylation of the ethoxylated fatty acid or the ethoxylated fatty alcohol is from 2 degrees to 60 degrees.

3. The stable liquid nano-particle emulsion according to claim 1, wherein the ethoxylated fatty acid has a carbon chain length of 6 to 26 carbons.

4. The stable liquid nano-particle emulsion according to claim 1, wherein the agricultural chemistry is selected from the group consisting of pesticides, stimulants, herbicides, desiccants, defoliants, fungicides, growth agents, water, sugars, hydrocarbons, plant acids, nutrients, fertilizers, hormones, and combinations thereof.

5. A stable liquid nano-particle emulsion comprising nano-particles, wherein the nano-particles comprise:
   about 6.0 wt. % of essential orange oil or a C10-C22 methyl ester derived from a seed oil;
   about 7.0 wt. % of a sodium lauryl ether sulfate;
   about 8.0 wt. % of an alkoxylated alcohol or alkoxylated alkylphenol;
   about 13.0 wt. % of sodium dodecylbenzene sulfonate;
   about 1.7 wt. % of alpha olefin sulfonate;
   about 1.5 wt. % of additives including an antioxidant agent, preservative, hydrotrope agent and pH adjuster;
   about 62.8 wt. % of water;
   wherein the nano-particles have a D50 and a mean average particle size of less than 100 nm, wherein the nano-particles are diluted to form the stable liquid nano-particle emulsion, and
   wherein the stable nano-particle emulsion is adapted for use as a carrier for an agricultural chemistry.

6. The stable liquid nano-particle emulsion according to claim 5, wherein the degree of alkoxylation of the alkoxylated alcohol or alkoxylated alkylphenol is from 2 degrees to 60 degrees.

7. The stable liquid nano-particle emulsion according to claim 5, wherein the alkoxylated alcohol or alkoxylated alkylphenol is ethoxylated, and has a carbon chain length of 6 to 26 carbons.

8. The stable liquid nano-particle emulsion according to claim 5, wherein the agricultural chemistry is selected from the group consisting of pesticides, stimulants, herbicides, desiccants, defoliants, fungicides, growth agents, water, sugars, hydrocarbons, plant acids, nutrients, fertilizers, hormones, and combinations thereof.

* * * * *